(12) United States Patent
Kudo

(10) Patent No.: US 7,177,760 B2
(45) Date of Patent: Feb. 13, 2007

(54) DRIVING CONTROL DEVICE FOR VEHICLE

(75) Inventor: Shinya Kudo, Tokyo (JP)

(73) Assignee: Fuji Jukagyo Kabushiki Kaisha, Tokyo (JP)

( * ) Notice: Subject to any disclaimer, the term of this patent is extended or adjusted under 35 U.S.C. 154(b) by 191 days.

(21) Appl. No.: 10/923,428

(22) Filed: Aug. 20, 2004

(65) Prior Publication Data

US 2005/0043867 A1    Feb. 24, 2005

(30) Foreign Application Priority Data

Aug. 21, 2003   (JP)   ............................. 2003-297998

(51) Int. Cl.
*B60W 10/00* (2006.01)
*B60W 30/10* (2006.01)
*G01C 21/00* (2006.01)

(52) U.S. Cl. ........................................ 701/209; 701/23

(58) Field of Classification Search ...................... None
See application file for complete search history.

(56) References Cited

U.S. PATENT DOCUMENTS 5,610,815 A * 3/1997 Gudat et al. .................. 701/23
5,926,082 A   7/1999 Shimizu
5,928,299 A   7/1999 Sekine
6,070,112 A   5/2000 Sato
6,134,491 A   10/2000 Kawagoe
6,151,539 A * 11/2000 Bergholz et al. .............. 701/25
6,282,478 B1  8/2001 Akita

FOREIGN PATENT DOCUMENTS

EP    0640903 A    3/1995
EP    1063149 A    12/2000
JP    10-076964    3/1998

* cited by examiner

*Primary Examiner*—Michael J. Zanelli
(74) *Attorney, Agent, or Firm*—Smith, Gambrell & Russell

(57) ABSTRACT

In the event that the differential value of the target node deviation is equal to or greater than a deviation threshold, and the absolute value of the steering torque is equal to or greater than a steering torque threshold, the system outputs signals to a brake control device such that deceleration of the vehicle is made with a predetermined deceleration, and outputs signals to an electric power steering control device so as to cancel automatic steering, whereby the system enters a normal power steering mode, and the automatic driving mode is canceled. Thus, abnormal situations are precisely detected during automatic driving, giving consideration to the control error and the intent of the user, thereby enabling driving control matching the intent of the user.

19 Claims, 6 Drawing Sheets

DRIVING CONTROL DEVICE FOR VEHICLE

This application claims benefit of Japanese Application No. 2003-297998 filed on Aug. 21, 2003, the contents of which are incorporated by this reference.

BACKGROUND OF THE INVENTION

1. Field of the Invention

The present invention relates to a driving control device for controlling automatic driving of a vehicle by controlling the vehicle speed and automatic steering corresponding to a planned route based upon the set planning route, the current position of the vehicle on the planning route, and the current route of the vehicle.

2. Description of the Related Art

In recent years, navigation devices are widely used for vehicles, which employ a Global Positioning System (GPS) for detecting the position of the vehicle based upon the position data received from artificial satellites. Furthermore, various techniques have been proposed and put into practical use, wherein driving of the vehicle is controlled based upon the vehicle-position information obtained by the GPS, forward road information obtained by a camera or the like, and so forth.

For example, a technique is disclosed in Japanese Unexamined Patent Application Publication No. 10-76964, wherein information with regard to the road ahead of the vehicle (painted line on the road) is detected with a CCD camera, and the steering angle is determined based upon determination results of the moving direction of the vehicle in order to automatically control a steering device. During the automatic steering driving, in the event that the distance between the future position of the vehicle of a predetermined distance ahead of the current position thereof and the painted line.(i.e., lateral deviation) exceeds a predetermined threshold, the system determines that any abnormal situation occurs and that whether the automatic driving mode can be cancelled or not. In this case, the automatic driving is maintained until the system making a determination that the automatic driving mode can be cancelled from the time of the system making a determination that the automatic driving mode cannot be cancelled.

With the aforementioned technique disclosed in Japanese Unexamined Patent Application Publication No. 10-76964, the system determines occurrence of abnormal situations only based upon the amount of lateral deviation. However, in many cases, control error causes fluctuation of the lateral deviation, and accordingly, precision in detection of true abnormal situations is greatly affected by tuning of the device, posing a problem of stability and accuracy of the driving control.

The present invention has been made in order to solve the aforementioned problems, and accordingly, it is an object thereof to provide a driving control device for detecting abnormal situations during automatic driving with high precision based upon the control error and the intent of the user so as to control driving of the vehicle according to the intent of the user.

SUMMARY OF THE INVENTION

A driving control device for a vehicle according to the present invention comprises: planning-route setting means for setting a planning route along which the vehicle is to be driven; vehicle-position computing means for computing the position of the vehicle; vehicle-direction estimating means for estimating the direction of the vehicle; and driving control means for controlling automatic driving of the vehicle based upon the vehicle position, the vehicle direction, and the planning route, and the driving control means stop driving control of the vehicle in the event that the differential value of the distance between the future position of the vehicle ahead of the current position thereof and the planning route exceeds a predetermined threshold, and the steering torque exceeds a predetermined threshold.

The above and other objects, features and advantages of the invention will become more clearly understood from the following description referring to the accompanying drawings.

DETAILED DESCRIPTION OF THE PREFERRED EMBODIMENTS

Description will be made below regarding an embodiment according to the present invention with reference to FIGS. 1 through 8.

Figure 1:
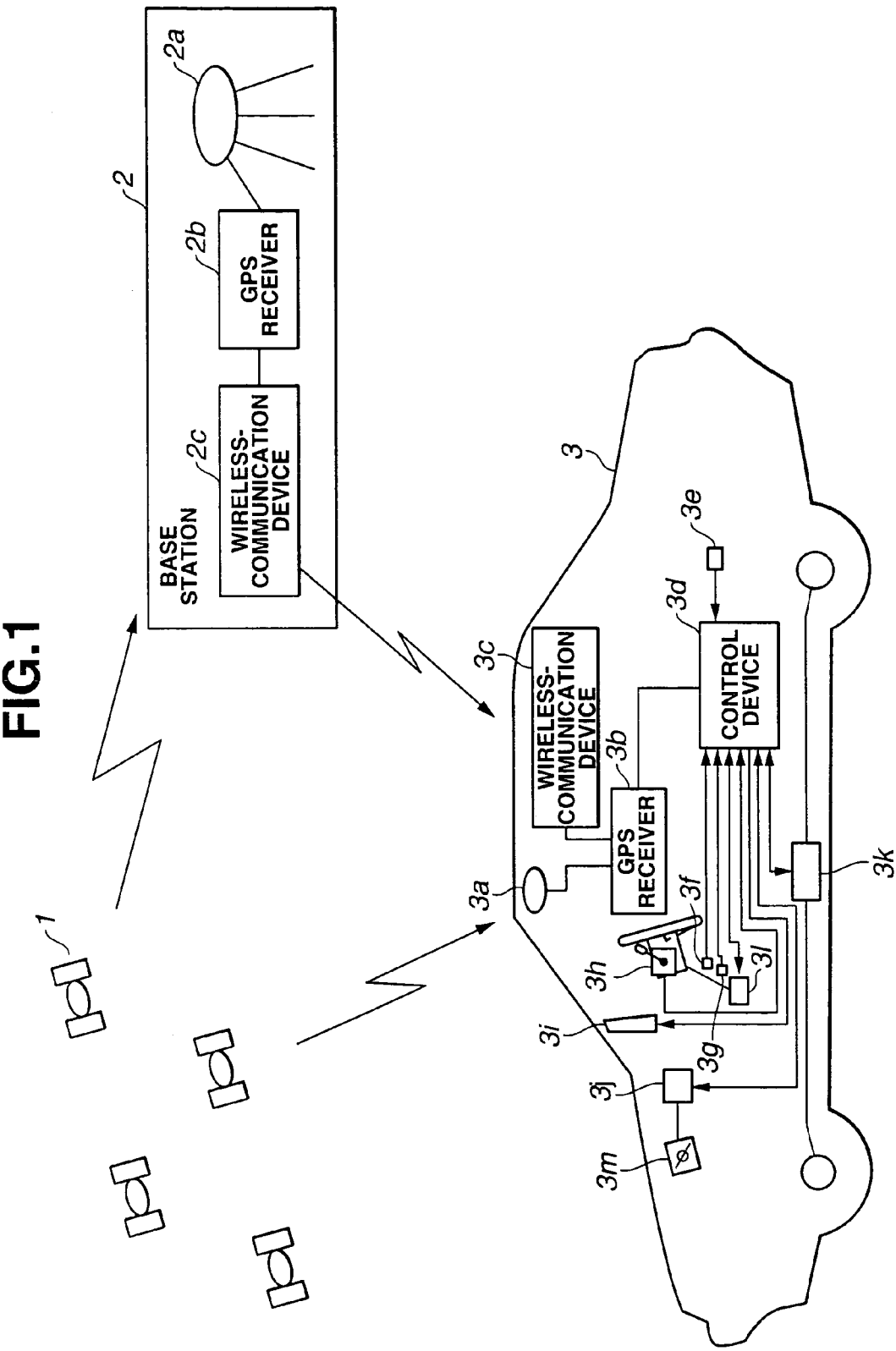
FIG. 1 is a schematic explanatory diagram which shows an overall configuration of a driving control device for a vehicle.

As shown in FIG. 1, with the present embodiment, a GPS known as an RTK (Real-Time Kinematic) GPS is employed. That is to say, the information (data such as satellite-orbit information for performing positioning calculation and so forth) from artificial satellites. (GPS satellites) 1 orbiting the Earth is received by a base station 2 and a vehicle 3 serving as a moving station.

The base station 2 is installed at a position which has been measured beforehand with sufficient precision, and principally includes a GPS antenna 2a, a GPS receiver 2b, and a wireless communication device 2c. The base station 2 transmits the phase information with regard to the radio wave from the GPS satellites 1, the pseudo range, and the position coordinates of the base station 2, to a point which is to be measured, i.e., the vehicle 3 as the moving station, using the wireless communication device 2c. Specifically, the data transmitted from the base station 2 to the vehicle 3 includes: error correction data; pseudo-range correction data; and the position coordinates of the base station 2.

The vehicle 3 includes a GPS antenna 3a, a GPS receiver 3b, and a wireless communication device 3c. The GPS receiver 3b calculates the position (position coordinates) of the vehicle with high precision (e.g., margin of error of 1 to 5 cm) in real time by analyzing the error correction data, the pseudo-range correction data, and the position coordinates of the base station 2, received from the base station 2 (data received through the wireless communication device 3*c*) and the information directly received from the GPS satellites 1. As described above, the GPS receiver 3*b* has a function as vehicle-position detecting means for detecting the position of the vehicle.

Furthermore, the vehicle 3 includes a control device 3*d* having functions of vehicle-direction estimating means, planning-route setting means, and driving control means. Note that the control device 3*d* is connected to the GPS receiver 3*b* through an unshown serial-CAN converter or the like for receiving the information with regard to the current position of the vehicle. Furthermore, the control device 3*d* is connected to sensors such as a speed sensor 3*e* for detecting the speed V of the vehicle, a steering-angle sensor 3*f* for detecting the steering angle θH, a steering torque sensor 3*g* for detecting steering torque TH applied from the user, and so forth, and a main switch 3*h* for switching to the automatic-driving control mode.

Furthermore, the control device 3*d* of the vehicle 3 includes an unshown storage medium such as a hard disk, CD, DVD, or the like, which has map information stored therein necessary for the automatic-driving control. The map information is suitably displayed on a liquid crystal display 3*i* mounted on a dash board thereof, for example. Upon the user inputting a destination through an unshown remote control device or the like, the current vehicle position and the optimum route from the current position to the destination are calculated and displayed on a map shown on the liquid crystal display 3*i*. Note that the calculated optimum route is set as a planning route (formed of a node line) along which the vehicle is to be driven.

Furthermore, the control device 3*d* of the vehicle 3 is connected to actuators for performing automatic-driving control, such as an electric throttle control device 3*j*, a brake control device 3*k*, and an electric power steering control device 3*l*.

Upon the user turning on the main switch 3*h* for switching to the automatic-driving control mode, control of the vehicle speed is executed in the automatic-driving control mode, whereby the target vehicle speed is determined. The control device 3*d* outputs signals to the electric throttle control device 3*j* so as to drive a throttle 3*m* such that the vehicle is accelerated or decelerated in order to maintain the target vehicle speed. Furthermore, in the event that deceleration of the vehicle must be made beyond a predetermined deceleration, the control device 3*d* outputs signals to the brake control device 3*k* so as to operate an automatic brake.

Furthermore, as described later, in the event that the control device 3*d* detects any abnormal situation of automatic driving (a situation wherein the user requests canceling of automatic driving) during diagnostic processing according to an automatic-driving diagnostic program, the control device 3*d* outputs signals to the brake control device 3*k* so as to drive automatic brake such that deceleration of the vehicle is made with a predetermined deceleration.

Next, description will be made regarding automatic steering performed in the automatic-driving control mode of the control device 3*d* of the vehicle 3 with reference to the flowchart shown in FIG. 2 and the explanatory diagram for describing the mechanism of the automatic steering shown in FIG. 3. Note that in the event that the control device 3*d* detects any abnormal situation of automatic driving (a situation wherein the user requests canceling of automatic driving) during diagnostic processing according to the automatic-driving diagnostic program, the system enters a normal power steering mode.

Figure 2:
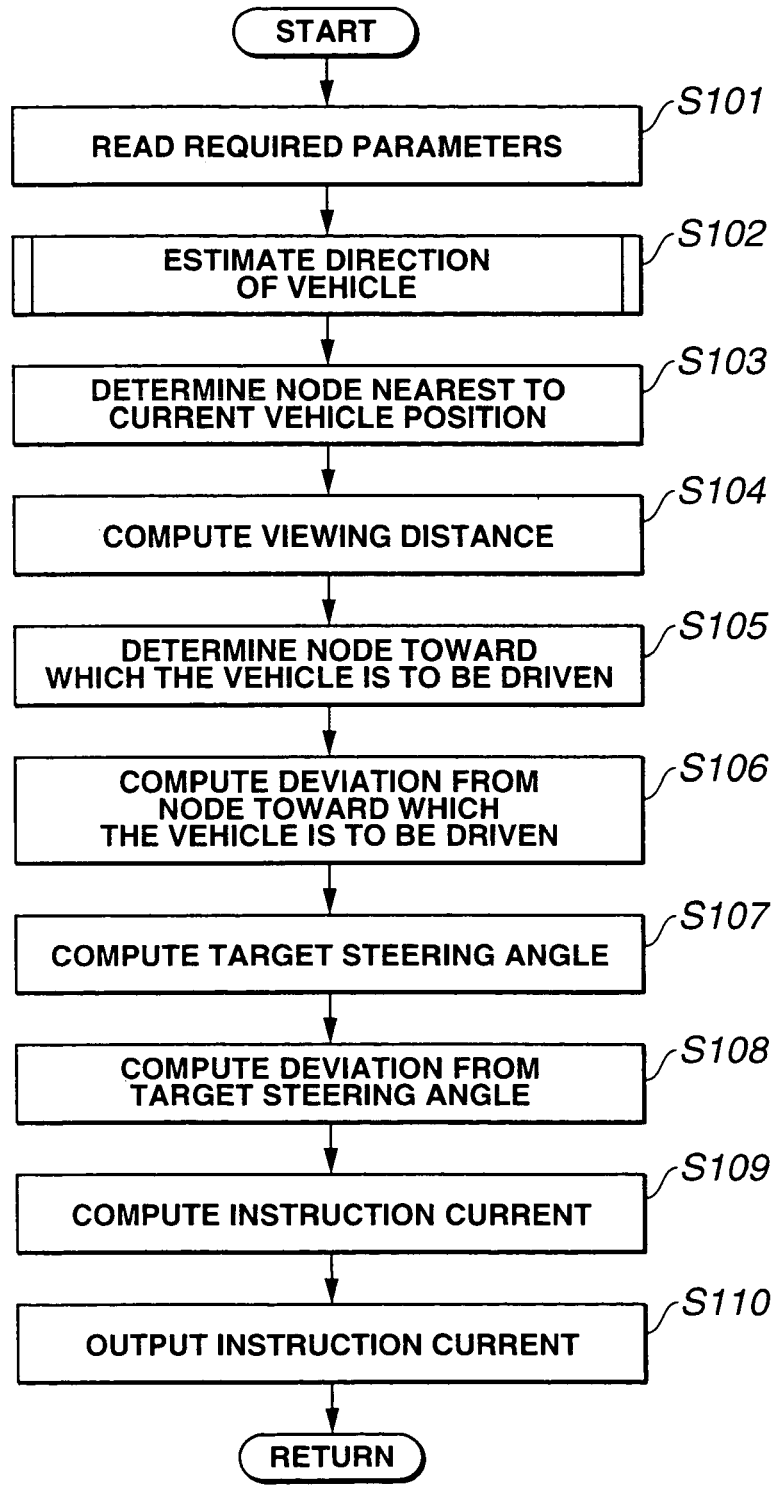
FIG. 2 is a flowchart which shows processing for automatic steering in an automatic-driving control mode.
Figure 3:
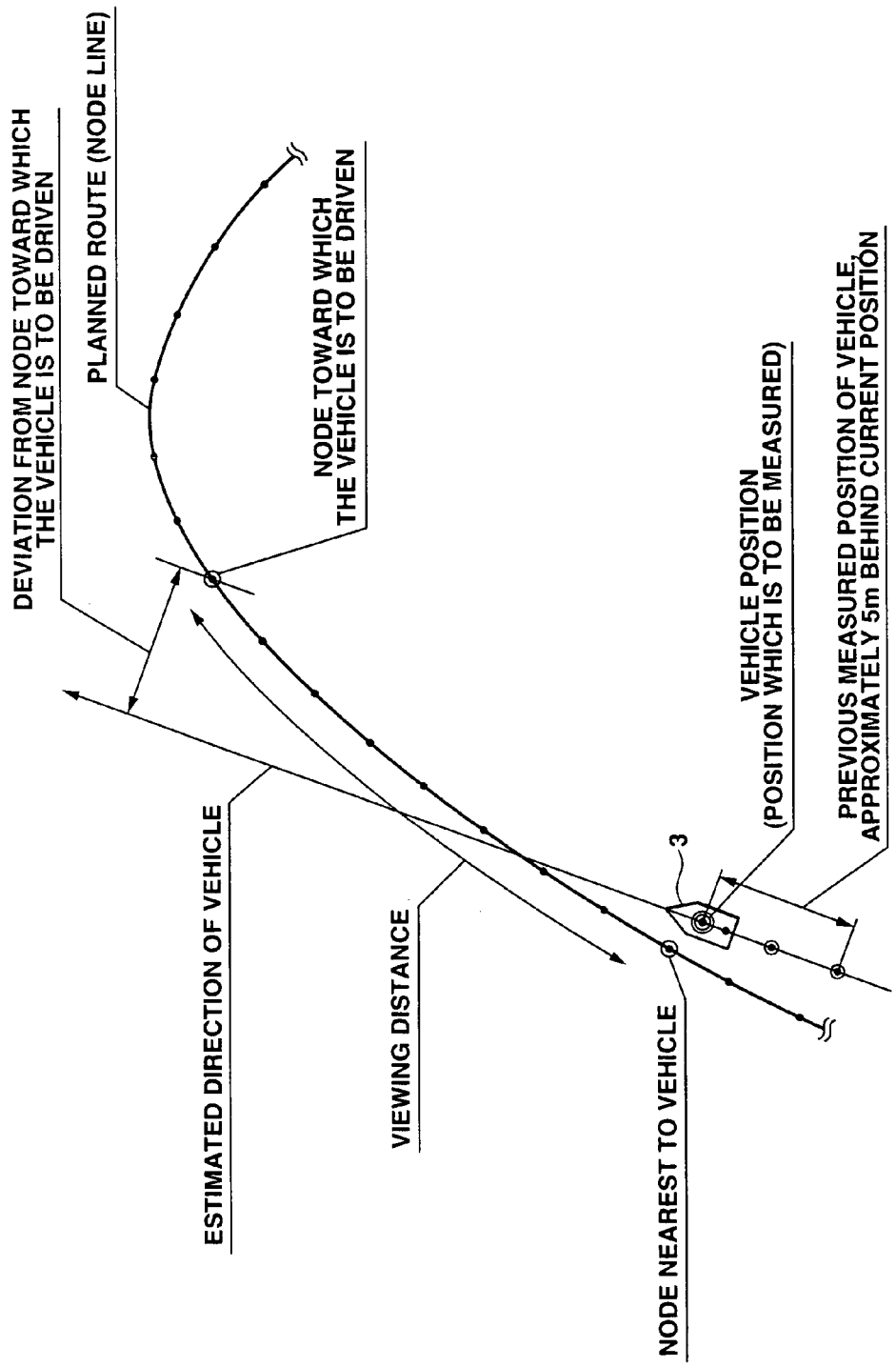
FIG. 3 is an explanatory diagram for describing the mechanism of the automatic steering.

The flowchart in FIG. 2 shows a program executed at predetermined intervals of time upon the user turning on the main switch 3*h* for switching to the automatic-driving control mode. First, in Step 101 (which will be abbreviated to "S101" hereafter), the control device 3*d* reads the required parameters.

Next, the flow proceeds to S102, where the control device 3*d* extracts the previous position of the vehicle, approximately the length of the vehicle (e.g., 5 m) behind the current position, from vehicle-position-history information, and estimates the direction of the vehicle to be the direction passing through the current position of the vehicle and the previous position, 5 m behind the current position.

Next, the flow proceeds to S103, where the control device 3*d* extracts the node on the planning route nearest to the current position of the vehicle.

Subsequently, the flow proceeds to S104, where the control device 3*d* calculates the viewing distance based upon the current speed of the vehicle and a predetermined viewing time (e.g., 1.5 sec). For example, in the event that the current speed of the vehicle is 20 km/h, the viewing distance is 5.56 m×1.5 sec=8.34 m.

Subsequently, the flow proceeds to S105, where the control device 3*d* determines a node on the planning route, approximately the viewing distance calculated in S104 ahead of the current position of the vehicle, and sets the node thus determined as a node toward which the vehicle is to be driven.

Next, the flow proceeds to S106, the control device 3*d* computes the lateral deviation of the direction of the vehicle from the node toward which the vehicle is to be driven, as the node deviation ΔD.

Next, the flow proceeds to S107, where the control device 3*d* calculates the target steering angle δh such that the node deviation ΔD becomes zero using Expression (1) described below.

$$\delta h = Gp \cdot \Delta D + Gd \cdot (d(\Delta D)/dt) \quad (1)$$

Note that Gp represents a proportional gain, and Gd represents a differential gain.

Next, the flow proceeds to S108, where the control device 3*d* computes the steering-angle deviation Δδ (=δh−θH) based upon the target steering angle δh and the actual steering angle θH detected by the steering-angle sensor 3*f*.

Subsequently, the flow proceeds to S109, where the control device 3*d* computes an instruction current Iδ for being applied to an electric power steering motor of the electric power steering control device 31 such that the steering-angle deviation Δδ becomes zero using Expression (2) described below. Subsequently, the flow proceeds to S110, where the control device 3*d* outputs the instruction current Iδ, whereby the routine of the program ends.

$$I\delta = Kp \cdot \Delta\delta + Kd \cdot (d(\Delta\delta)/dt) + Ki \cdot \int \Delta\delta dt \quad (2)$$

Note that Kp is a proportional gain, Kd is a differential gain, and Ki is an integral gain.

Figure 4:
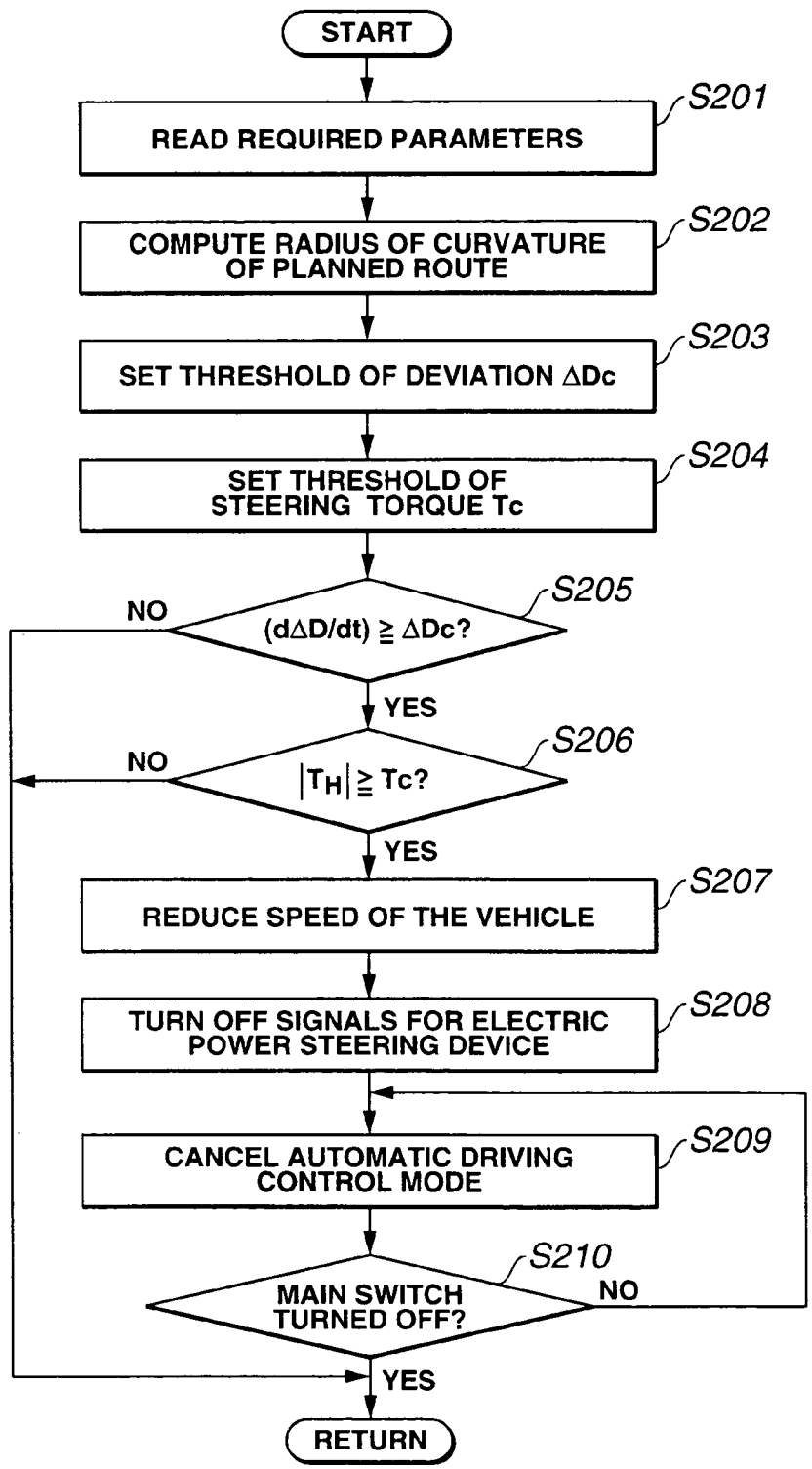
FIG. 4 is a flowchart for describing processing according to an automatic-driving diagnostic program.

Next, description will be made regarding an automatic-driving diagnostic program executed by the control device 3*d* of the vehicle 3 with reference to the flowchart shown in FIG. 4. First, the control device 3*d* reads required parameters in S201, and computes the radius of curvature R of the planning route in S202. For example, the control device 3*d* computes the radius of curvature R by calculating the radius of the circle passing through the three nodes on the planning route. Note that the control device 3*d* may select: the node toward which the vehicle is to be drive, and the nodes adjacent to the aforementioned node, as shown in FIG. 3; the node nearest to the current position of the vehicle and the nodes adjacent to the nearest nodes; or the node at a position, the predetermined viewing distance ahead of the current vehicle position, and the nodes adjacent to the aforementioned node. Now, description will be made regarding an arrangement wherein the control device 3*d* selects the node toward which the vehicle is to be driven, and the nodes adjacent to the nearest node.

Figure 5:
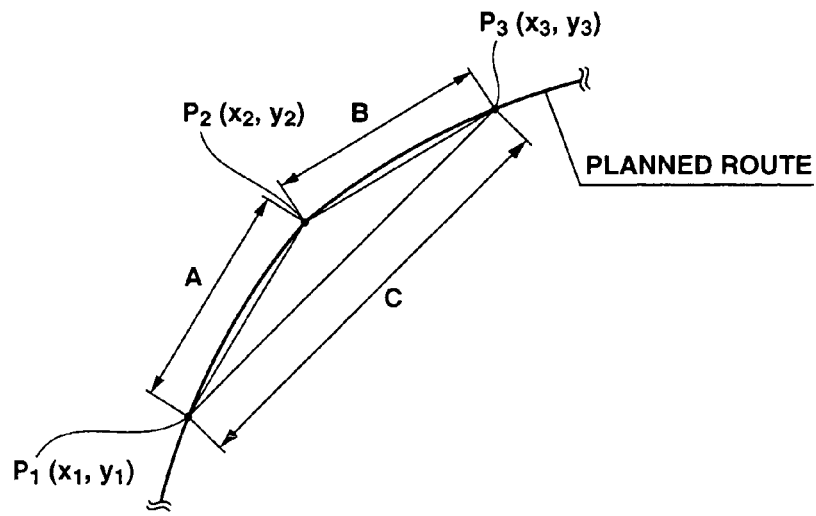
FIG. 5 is an explanatory diagram for describing calculation for the radius of curvature of a planning route.

As shown in FIG. 5, the control device 3*d* selects three nodes of P1(x1, y1), P2(x2, y2), and P3(x3, y3), in the coordinate space of X and Y. In this case, the X axis represents the lateral direction of the vehicle 3, and the Y axis represents the longitudinal direction thereof. Now, with the segment between P1 and P2 as A, with the segment between P2 and P3 as B, and with the segment between P3 and P1 as C, the radius R of the circle passing through the three points of P1, P2, and P3, is calculated by Expression (3) described below.

$$R=(A+B+C)/(4\cdot Sa) \quad (3)$$

Note that Sa represents the area of the triangle P1–P2–P3, and is calculated by Expression (4) described below.

$$Sa=(\lambda\cdot(\lambda-A)\cdot(\lambda-B)\cdot(\lambda-C))^{1/2} \quad (4)$$

Note that $\lambda$ represents (A+B+C)/2.

On the other hand, the segments A, B, and C are calculated by following Expressions.

$$A=((y2-y1)^2+(x2-x1)^2)^{1/2} \quad (5)$$

$$B=((y3-y2)^2+(x3-x2)^2)^{1/2} \quad (6)$$

$$C=((y1-y3)^2+(x1-x3)^2)^{1/2} \quad (7)$$

Figure 6:
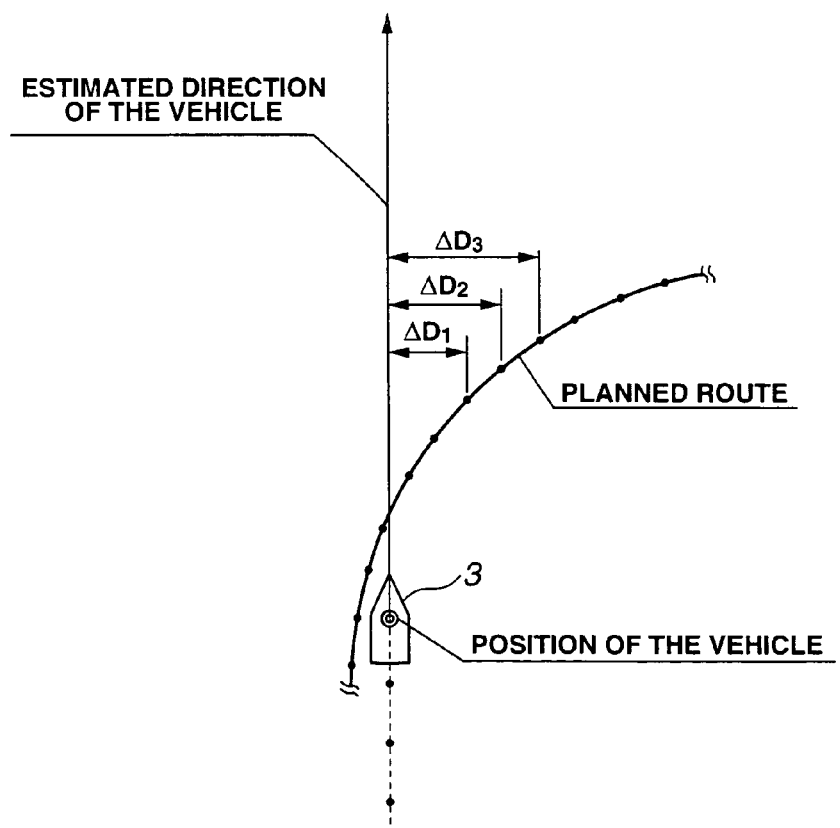
FIG. 6 is an explanatory diagram for describing change in target node deviation.
Figure 7:
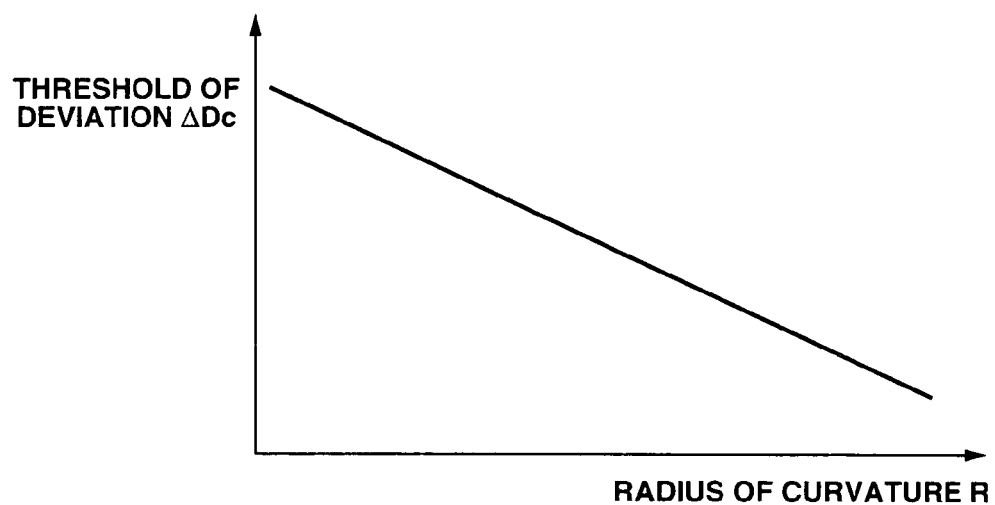
FIG. 7 is an explanatory diagram which shows the relation between the deviation threshold and the radius of curvature.
Figure 8:
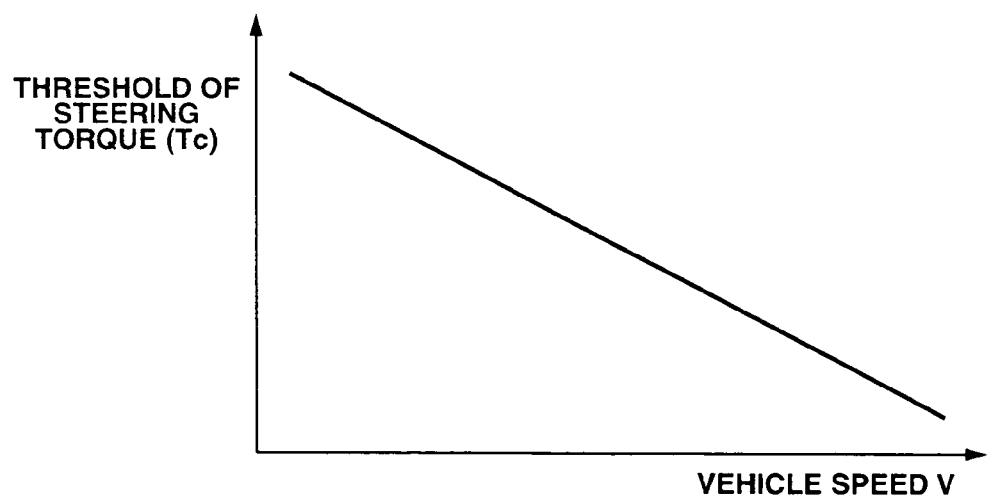
FIG. 8 is an explanatory diagram which shows the relation between the threshold of the steering torque and the vehicle speed.

Next, the flow proceeds to S203, where the control device 3*d* determines a change history of the target node deviation $\Delta D$. Namely, a deviation threshold $\Delta Dc$ for being compared with the differential value (d$\Delta D$/dt) of the target node deviation $\Delta D$ is determined. Note that the target node deviation $\Delta D$ changes from $\Delta D1$ to $\Delta D3$ through $\Delta D2$ along the planning route as shown in FIG. 6. The greater the radius of curvature R is, the smaller the deviation threshold $\Delta Dc$ is set to be, as shown in the relation in FIG. 7.

Next, the flow proceeds to S204, where the control device 3*d* determines a steering torque threshold Tc for being compared with the absolute value |TH| of the steering torque TH. The greater the vehicle speed V is, the smaller the steering torque threshold Tc is set to, as shown in the relation in FIG. 8.

Subsequently, the flow proceeds to S205, where the control device 3*d* makes a comparison between the differential value (d$\Delta D$/dt) of the target node deviation $\Delta D$ and the deviation threshold $\Delta Dc$. In the event that the control device 3*d* has determined that the differential value (d$\Delta D$/dt) of the target node deviation $\Delta D$ is less than the deviation threshold $\Delta Dc$ (i.e., (d$\Delta D$/dt)<$\Delta Dc$), the following processing according to the program is skipped. On the other hand, in the event that the differential value (d$\Delta D$/dt) of the target node deviation $\Delta D$ is equal to or greater than the deviation threshold $\Delta Dc$ (i.e., (d$\Delta D$/dt)$\geq \Delta Dc$), the flow proceeds to S206.

In S206, the control device 3*d* makes a comparison between the absolute value |TH| of the steering torque TH and the steering torque threshold Tc. In the event that the control device 3*d* has determined that the absolute value |TH| of the steering torque TH is less than the steering torque threshold Tc (i.e., |TH|<Tc), the following processing according to the program is skipped. On the other hand, in the event that the control device 3*d* has determined that the absolute value |TH| of the steering torque TH is equal to or greater than the steering torque threshold Tc (i.e., |TH|$\geq$Tc), the flow proceeds to S207.

In the event that determination has been made that (d$\Delta D$/dt)$\geq \Delta Dc$ in S205, and determination has been made that |TH|$\geq$Tc in S206, the flow proceeds to S207, where the control device 3*d* outputs signals to the brake control device 3*k* so as to drive the automatic brake such that the deceleration of the vehicle is made with a predetermined deceleration.

Subsequently, the flow proceeds to S208, where the control device 3*d* outputs signals to the electric power steering control device 3*l* so as to cancel automatic steering, whereby the system enters a normal power steering mode. Subsequently, the flow proceeds to S209, where the control device 3*d* cancels the automatic-driving control mode, and turns off the main switch 3*h*.

Subsequently, the flow proceeds to S210, where the control device 3*d* determines whether or not the main switch 3*h* is turned on again. In the event that determination has been made that the main switch 3*h* is off, the flow returns to S209, whereby the system maintains the normal power steering mode. Upon the user turning on the main switch 3*h*, the flow skips this loop so that the system enters the automatic-driving control mode.

That is to say, with the automatic-driving diagnostic program according to the present embodiment, only in the event that the differential value (d$\Delta D$/dt) of the target node deviation $\Delta D$ is equal to or greater than the deviation threshold $\Delta Dc$, and the absolute value |TH| of the steering torque TH is equal to or greater than the steering torque threshold Tc, the system cancels the automatic driving.

The reason is that in some cases, insignificant control error increases the target node deviation $\Delta D$, and precision in detection of true abnormal situations is greatly affected by tuning of the device, and accordingly, it is difficult to suitably determine abnormal situations only by detecting an increase in the target node deviation $\Delta D$.

Furthermore, in the event that the system determines abnormal situations of driving control only by detecting an increase in the steering torque TH, the system may determine unintentional steering actions of the user to be an abnormal situation of driving control.

With the present embodiment, in the event that both the aforementioned relations are satisfied, the system determines that the user requests cancel of the automatic driving (e.g., a case wherein the user avoids an obstacle ahead of the vehicle), and the system detects this situation as an abnormal situation, thereby enabling driving control matching the intent of the user.

Note that while description has been made regarding an arrangement wherein the vehicle position is computed based upon information from artificial satellites orbiting the Earth, and the optimum route from the current position of the vehicle to a destination is determined as a planning route using map information, the present invention is not restricted to the aforementioned arrangement. For example, an arrangement may be made wherein the system includes a CCD camera for taking images of the road ahead of the vehicle, and painted lines on the left and the right sides of the road in the images are detected with known image recognition, and a planning route along which the vehicle is to be driven is set along a line on the middle portion between the left and right painted lines, or on a line a predetermined distance from either thereof. In this case, the system computes the position of the vehicle based upon the distance between one of the painted lines and the vehicle 3, and estimates the direction of the vehicle based upon change in the vehicle position over time. Furthermore, in the same way as with the above-described embodiment, the system calculates the differential value of the distance deviation of the future position of the vehicle, a predetermined distance ahead of the current position of the vehicle 3, from the planning route. Only in the event that the calculated differential value of the distance is equal to or greater than the deviation threshold ΔDc, and the absolute value |TH| of the steering torque TH is equal to or greater than the steering torque threshold Tc, the system cancels the automatic-driving control mode. An arrangement having such a configuration employing an image recognition technique using a CCD camera has the same advantages as with the above-described embodiment.

As described above, the present invention enables precise detection of abnormal situations during automatic driving, giving consideration to the control error and the intent of the user, thereby enabling driving control matching the intent of the user.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A driving control device for a vehicle comprising:
    planning-route setting means for setting a planning route along which the vehicle is to be driven;
    vehicle-position computing means for computing the position of the vehicle;
    vehicle-direction estimating means for estimating the direction of the vehicle; and
    driving control means for controlling automatic driving of the vehicle based upon the vehicle position, the vehicle direction, and the planning route,
    wherein the driving control means stops driving control of the vehicle in the event that the differential value of the distance between the future position of the vehicle ahead of the current position of the vehicle and the planning route exceeds a predetermined threshold, and the steering torque exceeds a predetermined value.

2. The driving control device for the vehicle according to claim 1, wherein the driving control means stops driving control of the vehicle by performing at least one of deceleration of the vehicle and canceling of an automatic steering mode in the event that the differential value of the distance between the future position of the vehicle ahead of the current position of the vehicle and the planning route exceeds the predetermined threshold, and the steering torque exceeds the predetermined value.

3. The driving control device for the vehicle according to claim 1, wherein the driving control means determines whether or not the differential value of the distance between the future position of the vehicle ahead of the current position of the vehicle and the planning route exceeds the predetermined threshold by comparing the differential value of the distance with a threshold determined corresponding to the radius of curvature of the planning route.

4. The driving control device for the vehicle according to claim 2, wherein the driving control means determines whether or not the differential value of the distance between the future position of the vehicle ahead of the current position of the vehicle and the planning route exceeds the predetermined threshold by comparing the differential value of the distance with a threshold determined corresponding to the radius of curvature of the planning route.

5. The driving control device for the vehicle according to claim 1, wherein the predetermined value for being compared with the steering torque in a determination step is determined corresponding to the vehicle speed.

6. The driving control device for the vehicle according to claim 2, wherein the predetermined value for being compared with the steering torque in a determination step is determined corresponding to the vehicle speed.

7. The driving control device for the vehicle according to claim 3, wherein the predetermined value for being compared with the steering torque in a determination step is determined corresponding to the vehicle speed.

8. The driving control device for the vehicle according to claim 4, wherein the predetermined value for being compared with the steering torque in a determination step is determined corresponding to the vehicle speed.

9. The driving control device for the vehicle according to claim 1, wherein the vehicle-position computing means computes the position of the vehicle based upon information from satellites orbiting the Earth.

10. The driving control device for the vehicle according to claim 2, wherein the vehicle-position computing means computes the position of the vehicle based upon information from satellites orbiting the Earth.

11. The driving control device for the vehicle according to claim 3, wherein the vehicle-position computing means computes the position of the vehicle based upon information from satellites orbiting the Earth.

12. The driving control device for the vehicle according to claim 4, wherein the vehicle-position computing means computes the position of the vehicle based upon information from satellites orbiting the Earth.

13. The driving control device for the vehicle according to claim 1, wherein the vehicle-direction estimating means estimates the direction of the vehicle based upon change in the vehicle position over time.

14. The driving control device for the vehicle according to claim 2, wherein the vehicle-direction estimating means estimates the direction of the vehicle based upon change in the vehicle position over time.

15. The driving control device for the vehicle according to claim 3, wherein the vehicle-direction estimating means estimates the direction of the vehicle based upon change in the vehicle position over time.

16. The driving control device for the vehicle according to claim 4, wherein the vehicle-direction estimating means estimates the direction of the vehicle based upon change in the vehicle position over time.

17. The driving control device for the vehicle according to claim 8, wherein the vehicle-position computing means computes the position of the vehicle based upon information from satellites orbiting the Earth.

18. The driving control device for the vehicle according to claim 17, wherein the vehicle-direction estimating means estimates the direction of the vehicle based upon change in the vehicle position over time.

19. A vehicle containing the driving control device according to claim 1.

* * * * *